(12) United States Patent
Okuda et al.

(10) Patent No.: US 7,886,499 B2
(45) Date of Patent: Feb. 15, 2011

(54) BUILDING EXTERIOR WALL-COATING EMULSION COMPOSITIONS AND BUILDING EXTERIOR WALLS

(75) Inventors: Harukazu Okuda, Takefu (JP); Masahide Hatanaka, Takefu (JP); Akira Yamamoto, Gunma-ken (JP)

(73) Assignee: Nissin Chemical Industry Co., Ltd., Takefu-Shi (JP)

( * ) Notice: Subject to any disclaimer, the term of this patent is extended or adjusted under 35 U.S.C. 154(b) by 39 days.

(21) Appl. No.: 12/494,063

(22) Filed: Jun. 29, 2009

(65) Prior Publication Data

US 2009/0264576 A1    Oct. 22, 2009

Related U.S. Application Data

(60) Division of application No. 11/280,535, filed on Nov. 17, 2005, now abandoned, which is a continuation-in-part of application No. 10/785,993, filed on Feb. 26, 2004, now abandoned.

(30) Foreign Application Priority Data

Jun. 30, 2003   (JP)   ............... 2003-186205

(51) Int. Cl.
  *B05D 7/00*   (2006.01)
  *C09D 183/10*   (2006.01)
  *C09D 151/08*   (2006.01)
  *C09D 5/02*   (2006.01)

(52) U.S. Cl. .................. 52/750; 525/477; 525/63; 525/100; 525/101; 525/478; 525/479; 525/588

(58) Field of Classification Search .......... 524/588; 525/477, 63, 100, 101, 478, 479; 52/750
See application file for complete search history.

(56) References Cited

U.S. PATENT DOCUMENTS

| | | | |
|---|---|---|---|
| 4,463,127 A * | 7/1984 | Alberts et al. ............... | 524/731 |
| 4,648,904 A | 3/1987 | DePasquale et al. | |
| 4,994,522 A | 2/1991 | Sasaki et al. | |
| 4,994,523 A | 2/1991 | Sasaki et al. | |
| 5,179,144 A | 1/1993 | Yamamoto et al. | |
| 5,532,302 A | 7/1996 | Nakanishi et al. | |
| 5,767,206 A | 6/1998 | Ariagno et al. | |

FOREIGN PATENT DOCUMENTS

| | | |
|---|---|---|
| EP | 0098940 A3 | 1/1984 |
| JP | 58-213046 A | 12/1983 |
| JP | 61-009463 A | 1/1986 |
| JP | 62-197369 A | 9/1987 |
| JP | 03-115485 A | 5/1991 |
| JP | 03-281556 A | 12/1991 |
| JP | 04-018009 A | 1/1992 |
| JP | 04-261454 A | 9/1992 |
| JP | 06-179788 A | 6/1994 |
| JP | 06-279232 A | 10/1994 |
| JP | 06-344665 A | 12/1994 |
| JP | 08-027347 A | 1/1996 |
| JP | 08-199026 A | 8/1996 |
| JP | 09-020852 A | 1/1997 |
| JP | 09-208889 A | 8/1997 |
| JP | 09-208890 A | 8/1997 |
| JP | 09-217282 A | 8/1997 |
| JP | 09-241465 A | 9/1997 |
| JP | 09-328616 A | 12/1997 |
| JP | 10-280829 A | 10/1998 |
| JP | 2000-086429 A | 3/2000 |
| JP | 2000-143884 A | 5/2000 |
| JP | 2001-158845 A | 6/2001 |
| JP | 2003-096142 A | 4/2003 |

* cited by examiner

*Primary Examiner*—Kelechi C Egwim
(74) *Attorney, Agent, or Firm*—Birch, Stewart, Kolasch & Birch, LLP

(57) ABSTRACT

An emulsion composition for building exterior walls is provided comprising in admixture, [A] a graft copolymerized emulsion obtained by adding to (1) an oil-in-water type emulsion containing at least one organopolysiloxane having an organic group containing a radical reactive group or SH group, (2) a monomer or monomeric mixture containing at least 70 wt % of at least one monomer selected from acrylic and methacrylic monomers and effecting emulsion graft polymerization of component (2) to the organopolysiloxane, and [B] a silicone resin-containing emulsion. The emulsion composition is capable of forming an elastic, flexible coating which is endowed with water resistance, weather resistance, water repellency, adhesion and heat resistance and maintains these properties over a long period of time. It can thus be used as a base in a variety of paints and coating agents.

4 Claims, No Drawings

US 7,886,499 B2

BUILDING EXTERIOR WALL-COATING EMULSION COMPOSITIONS AND BUILDING EXTERIOR WALLS

CROSS-REFERENCE TO RELATED APPLICATION

The present application is a Divisional of application Ser. No. 11/280,535 filed on Nov. 17, 2005, now abandoned which is a continuation-in-part of application Ser. No. 10/785,993 filed on Feb. 26, 2004, now abandoned the entire contents of which are hereby incorporated by reference.

TECHNICAL FIELD

This invention relates to an emulsion composition for building exterior walls, comprising a graft copolymerized emulsion obtained through the emulsion graft copolymerization of a (meth)acrylic monomer or monomeric mixture thereof to an organopolysiloxane and a silicone resin-containing emulsion, and more particularly, to such an emulsion composition for building exterior walls capable of forming an elastic, flexible coating having water resistance, weather resistance, water repellency, adhesion and heat resistance and maintaining these properties over a long period of time. It also relates to a building exterior wall coated with the emulsion composition.

BACKGROUND OF THE INVENTION

In the paint and coating field, the transition of dispersing media from organic solvents to water is required from the standpoint of preventing environmental pollution or insuring a safe working environment. In this regard, emulsions obtained through the emulsion polymerization of radical polymerizable vinyl monomers, as typified by acrylic resin emulsions have been widely employed as the base for a variety of paints and coating compositions because they form satisfactory coatings. Unfortunately, they essentially lack water resistance and weather resistance.

A number of attempts have been made to overcome these drawbacks. For example, emulsions are obtained through the concurrent emulsion polymerization of a vinyl polymerizable functional group-containing alkoxysilane and a radical polymerizable vinyl monomer (see JP-A 61-9463 and JP-A 8-27347). Also proposed are aqueous emulsions which are obtained by emulsifying alkoxysilane compounds or partial hydrolytic condensates thereof using various surfactants (see JP-A 58-213046, JP-A 62-197369 and JP-A 3-115485) and a system having mixed therein an emulsion obtained through the emulsion polymerization of a polymerizable vinyl monomer (see JP-A 6-344665).

However, in the former approach wherein a vinyl polymerizable functional group-containing alkoxysilane is emulsion polymerized together with a radical polymerizable vinyl monomer, more alkoxy groups are retained because of inhibited hydrolysis and it is difficult to introduce a large amount of silicone resin component in a coating. Thus important properties such as weather resistance are not improved to a level that is considered satisfactory for exterior applications. The latter approach fails to offer satisfactory coating properties because active alkoxy groups are prone to hydrolysis over time, allowing an alcohol which is an organic solvent to form as a by-product within the system, and additionally because the degree of polymerization changes with time.

As mentioned above, the prior art known methods fail to provide satisfactory coating properties. There is a desire to have an emulsion composition for building exterior walls capable of forming an elastic, flexible coating having water resistance, weather resistance, water repellency, adhesion and heat resistance and maintaining these properties over a long period of time.

SUMMARY OF THE INVENTION

Therefore, an object of the present invention is to provide an emulsion composition for building exterior walls capable of forming an elastic, flexible coating having water resistance, weather resistance, water repellency, adhesion and heat resistance and maintaining these properties over a long period of time; and a building exterior wall coated therewith.

It has been found that an emulsion composition comprising a graft copolymerized emulsion obtained by mixing an emulsion of an organopolysiloxane having an organic group containing a radical reactive group and/or SH group with an acrylic and/or methacrylic monomer or a monomeric mixture based thereon and effecting emulsion graft polymerization of the monomer or monomeric mixture to the organopolysiloxane and a silicone resin-containing emulsion, when used in a building exterior wall application, forms an elastic, flexible coating which is endowed with water resistance, weather resistance, water repellency, adhesion and heat resistance and maintains these properties over a long period of time. The above-discussed problems of the prior art can be solved by this emulsion composition.

According to the invention, there is provided an emulsion composition for building exterior walls, comprising in admixture, [A] a graft copolymerized emulsion and [B] a silicone resin-containing emulsion. The graft copolymerized emulsion [A] is obtained by adding to (1) an oil-in-water type emulsion containing at least one organopolysiloxane having the general formula (I):

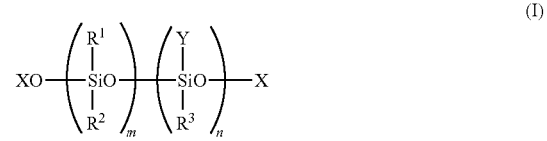

wherein $R^1$, $R^2$ and $R^3$ each are a monovalent hydrocarbon group or monovalent halogenated hydrocarbon group having 1 to 20 carbon atoms, Y is an organic group containing a radical reactive group or SH group, X is hydrogen, a monovalent lower alkyl group or a group of the formula: $R^1R^2R^4Si$ wherein $R^4$ is $R^1$ or Y, and $R^1$, $R^2$ and Y are as defined above, m is an integer of 1 to 10,000, and n is an integer of at least 1, (2) a monomer or monomeric mixture containing at least 70% by weight of at least one monomer selected from acrylic and methacrylic monomers having the general formula (II):

wherein $R^5$ is hydrogen or methyl, and $R^6$ is an alkyl or alkoxy-substituted alkyl group having 1 to 18 carbon atoms, so that a weight ratio of the organopolysiloxane of component (1) and the monomer or monomeric mixture of component (2) is 5:95 to 95:5, and effecting emulsion graft polymerization of component (2) to the organopolysiloxane. The silicone resin-containing emulsion [B] is obtained by mixing a silicone resin having the average compositional formula (i):

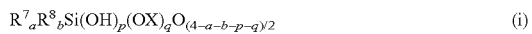

wherein $R^7$ is an unsubstituted monovalent hydrocarbon group of 1 to 10 carbon atoms, $R^8$ is a substituted monovalent hydrocarbon group of 1 to 10 carbon atoms, X is a monovalent hydrocarbon group of 1 to 6 carbon atoms, a, b, p and q are positive numbers satisfying the range: $0.50 \leq a \leq 1.80$, $0 \leq b \leq 1.00$, $0 < p \leq 1.50$, $0 \leq q \leq 0.50$, $0.50 \leq a+b \leq 1.80$, $0 < p+q \leq 1.50$, and $0.50 < a+b+p+q \leq 2.0$, with a radical polymerizable vinyl monomer and effecting emulsion polymerization.

Preferably, component (2) is a monomeric mixture of (a) 70 to 98% by weight of at least one monomer selected from acrylic and methacrylic monomers having the general formula (II):

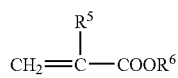

wherein $R^5$ is hydrogen or methyl, and $R^6$ is an alkyl or alkoxy-substituted alkyl group having 1 to 18 carbon atoms, (b) 2 to 10% by weight of at least one functional monomer selected from the group consisting of an ethylenically unsaturated amide, an alkylol or alkoxyalkyl-substituted compound of ethylenically unsaturated amide, an ethylenically unsaturated monomer containing an oxirane group, hydroxyl group, carboxyl group, amino group, sulfonate group, phosphate group, polyalkylene oxide group or quaternary ammonium base, a complete ester of a polyhydric alcohol with acrylic or methacrylic acid, allyl acrylate, allyl methacrylate and divinylbenzene, and (c) 0 to 20% by weight of an ethylenically unsaturated monomer other than components (a) and (b).

Also preferably, a polymeric product of the monomer or monomeric mixture as component (2) has a glass transition temperature of up to 0° C.

It is further preferred that a liquid organopolysiloxane containing at least three silicon-bonded hydrogen atoms in a molecule as a crosslinker and a catalyst for crosslinking reaction be incorporated in the emulsion composition.

Also contemplated herein is a building exterior wall coated with the emulsion composition of the invention.

The emulsion composition for building exterior walls of the invention is capable of forming an elastic, flexible coating which is endowed with water resistance, weather resistance, water repellency, adhesion and heat resistance and maintains these properties over a long period of time. The emulsion composition can thus be used as a base in a variety of paints and coating agents. The incorporation of a crosslinker and a crosslinking reaction catalyst in the emulsion composition enables further improvements in elasticity, flexibility, water resistance, weather resistance, water repellency and heat resistance. The emulsion composition is thus very advantageous in practical application to building exterior walls.

DESCRIPTION OF THE PREFERRED EMBODIMENTS

Component (1) used in the emulsion composition for building exterior walls according to the invention includes an organopolysiloxane having the general formula (I):

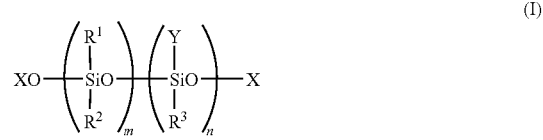

In formula (I), $R^1$, $R^2$ and $R^3$ are each independently monovalent hydrocarbon groups having 1 to 20 carbon atoms, preferably 1 to 8 carbon atoms, for example, alkyl groups such as methyl, ethyl, propyl and butyl, aryl groups such as phenyl, tolyl, xylyl and naphthyl, and aralkyl groups such as benzyl, or halogenated forms of the foregoing hydrocarbon groups in which some or all of the hydrogen atoms attached to carbon atoms are substituted with halogen atoms. Y is an organic group containing a radical reactive group or SH group, such as γ-acryloxypropyl, γ-methacryloxypropyl, γ-mercaptopropyl, vinyl or allyl. X is hydrogen, a lower alkyl group, preferably having 1 to 5 carbon atoms (e.g., methyl, ethyl, propyl or butyl) or a triorganosilyl group of the formula: $R^1R^2R^4Si$ wherein $R^4$ is $R^1$ or Y, and $R^1$, $R^2$ and Y are as defined above. The subscript m is an integer in the range of 1 to 10,000, and n is an integer of at least 1. Preferably m is an integer in the range from 500 to 8,000 and n is an integer in the range from 1 to 500, and more preferably m is from 2,000 to 8,000 and n is from 5 to 200.

The reactants from which the organopolysiloxane of formula (I) is prepared include:

cyclic organopolysiloxanes represented by the formula:

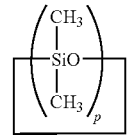

wherein p is an integer of 3 to 6, liquid dimethylpolysiloxanes blocked with a hydroxyl group at either end of its molecular chain, represented by the formula:

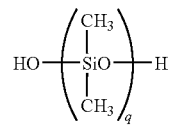

wherein q is a positive integer, liquid dimethylpolysiloxanes blocked with an alkoxy group at either end of its molecular chain, represented by the formulae:

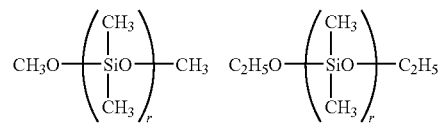

wherein r is a positive integer, and dimethylpolysiloxanes blocked with a trimethylsilyl group at either end of its molecular chain, represented by the formulae:

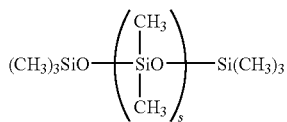

wherein s is 0 or a positive integer.

The reactants for introducing the radical reactive group and SH group include the silanes shown below.

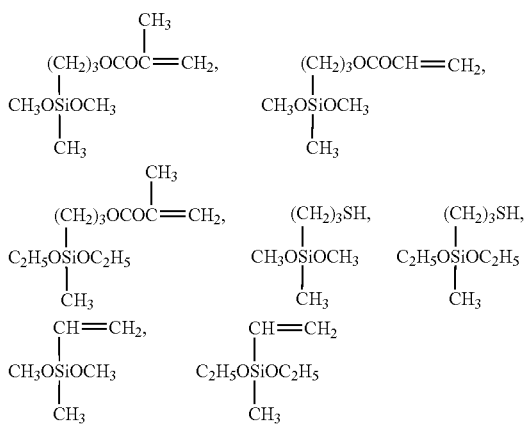

Also included are hydrolyzates of the foregoing silanes as exemplified by the following formulae.

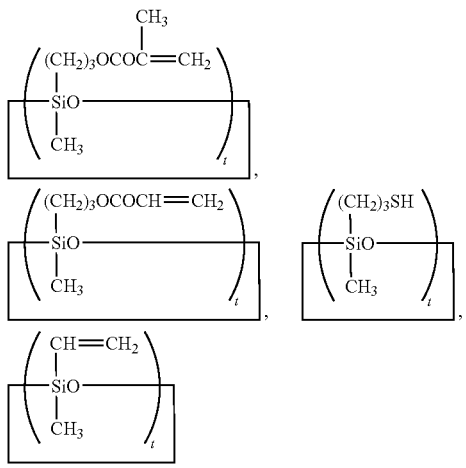

Herein t is an integer of 3 to 6.

It is noted that a trialkoxysilane which is trifunctional and a hydrolyzate thereof may be used in limited amounts that do not impair the objects of the invention.

A oil-in-water emulsion of the organopolysiloxane of formula (I) may be prepared by well-known methods. One exemplary method uses a cyclic low-molecular-weight siloxane such as octamethylcyclotetrasiloxane as listed above and a dialkoxysilane compound containing a radical reactive group or SH group and/or a hydrolyzate thereof as the starting reactants. The reactants are polymerized in the presence of a strongly alkaline or strongly acidic catalyst to form a high-molecular-weight organopolysiloxane, which is emulsified and dispersed in water with the aid of a certain emulsifier.

Another method uses a low-molecular-weight organopolysiloxane as listed above and a dialkoxysilane compound containing a radical reactive group or SH group and/or a hydrolyzate thereof as the starting reactants. The reactants are emulsion polymerized in water in the presence of a sulfonic acid surfactant and/or sulfate surfactant.

In another version of the emulsion polymerization, similar reactants are used and emulsified and dispersed in water with the aid of a cationic surfactant such as an alkyltrimethylammonium chloride or alkylbenzylammonium chloride, after which polymerization can be effected by adding an appropriate amount of a strongly alkaline substance such as potassium hydroxide or sodium hydroxide.

Described below are the catalysts and other reagents used in the above-described methods of preparing organopolysiloxane emulsion. Suitable strongly alkaline polymerization catalysts used when a high-molecular-weight organopolysiloxane is pre-formed include potassium hydroxide, sodium hydroxide, cesium hydroxide, tetramethylammonium hydroxide, and tetrabutylphosphonium hydroxide; and suitable strongly acidic polymerization catalysts include sulfuric acid and trifluoromethane sulfonic acid. At the end of polymerization, either catalyst is neutralized for deactivation, after which the reaction product is ready for subsequent use.

Suitable surfactants used for the emulsification of the resulting high-molecular-weight organopolysiloxane include nonionic surfactants such as polyoxyethylene alkyl ethers, polyoxyethylene alkyl phenyl ethers, polyoxyethylene alkyl esters, sorbitan fatty acid esters, polyoxyethylene sorbitan fatty acid esters, and sucrose fatty acid esters; anionic surfactants such as sodium lauryl sulfate and sodium polyoxyethylene dodecylsulfate; cationic surfactants such as alkyltrimethylammonium chlorides, alkylbenzylammonium chlorides, and dialkyldimethylammonium chlorides.

When an organopolysiloxane emulsion is prepared through emulsion polymerization, the sulfonic acid and sulfate surfactants serve as an emulsifier and polymerization catalyst. Exemplary surfactants include

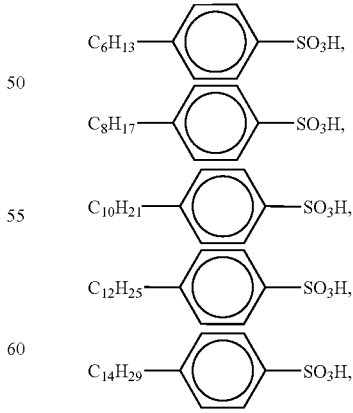

$C_8H_{17}(OC_2H_4)_2OSO_3H$, $C_{10}H_{21}(OC_2H_4)OSO_3H$, sodium laurylsulfate, and sodium polyoxyethylene dodecylphenylsulfate.

Of these, the sulfuric ester salt can be contacted with a cation exchange resin at the end of emulsification for conversion to the corresponding acid, which functions as a polymerization catalyst. After the completion of emulsion polymerization, the surfactant in acid form may be neutralized for deactivation.

The cationic emulsifiers used are typically quaternary ammonium salts as listed above. After the completion of emulsion polymerization, the surfactant in base form may be neutralized for deactivation.

The organopolysiloxane of formula (I) should desirably have as high a molecular weight as possible because a lower molecular weight is less effective for endowing a coating with elasticity and flexibility. For this reason, when an organopolysiloxane pre-formed by polymerization is emulsified and dispersed, this organopolysiloxane should preferably have a higher molecular weight. In the event of emulsion polymerization, since the organopolysiloxane increases its molecular weight as the temperature of ripening following polymerization lowers, the ripening temperature is desirably set at or below 30° C., more desirably at or below 15° C., and the ripening time is desirably about 24 to 72 hours, more desirably about 48 to 72 hours. Specifically the molecular weight of the organopolysiloxane is such that m+n in formula (I) is preferably in a range of 500 to 8,500, especially 2,000 to 7,000.

Component (2) is a polymerizable monomer or monomeric mixture which is subjected to graft copolymerization with the organopolysiloxane of component (1), and comprises at least 70% by weight, based on the weight of entire component (2), of at least one monomer selected from acrylic and methacrylic monomers having the general formula (II). Suitable monomers other than the acrylic and methacrylic monomers of formula (II), also referred to as constituent (a), include constituents (b) and (c) as shown below. Preferred component (2) is a mixture of constituents (a) and (b) or a ternary mixture of constituents (a), (b) and (c).

Constituent (a) is a (meth)acrylic monomer of the general formula (II). As used herein, the term "(meth)acrylic" is intended to designate both acrylic and methacrylic monomers.

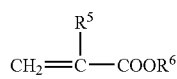
(II)

Herein $R^5$ is hydrogen or methyl, and $R^6$ is an alkyl or alkoxy-substituted alkyl group having 1 to 18 carbon atoms.

In formula (II), $R^6$ is an alkyl or alkoxy-substituted alkyl group having 1 to 18 carbon atoms, especially 1 to 8 carbon atoms. Examples include alkyl groups such as methyl, ethyl, propyl, isopropyl, butyl, isobutyl, tert-butyl, hexyl, and octyl, and alkoxy-substituted alkyl groups such as methoxyethyl, ethoxyethyl, and butoxyethyl. Illustrative examples of the (meth)acrylic monomer of formula (II) include alkyl(meth)acrylates such as methyl (meth)acrylate, ethyl(meth)acrylate, propyl(meth)acrylate, butyl(meth)acrylate, isobutyl(meth)acrylate, pentyl (meth)acrylate, hexyl(meth)acrylate, octyl (meth)acrylate, 2-ethylhexyl(meth)acrylate, lauryl(meth)acrylate, and stearyl(meth)acrylate; and alkoxyalkyl(meth)acrylates such as methoxyethyl(meth)acrylate and butoxyethyl (meth)acrylate. They may be used alone or in admixture of any.

The monomer of formula (II) accounts for at least 70% by weight, preferably 70 to 98% by weight, more preferably 80 to 95% by weight of the total weight of component (2). If the monomer of formula (II) is less than 70% by weight of the total weight of component (2), then acrylic properties, specifically mechanical strength, ozone resistance and adhesion are imparted insufficiently.

Constituent (b) is a functional monomer having an ethylenic double bond and a functional group such as an oxirane group, hydroxyl group, carboxyl group, amino group, sulfonate group, phosphate group, quaternary ammonium base or the like. Specifically, the functional monomer is selected from among an ethylenically unsaturated amide, an alkylol or alkoxyalkyl-substituted compound of ethylenically unsaturated amide, an ethylenically unsaturated monomer containing an oxirane group, hydroxyl group, carboxyl group, amino group, sulfonate group, phosphate group, polyalkylene oxide group or quaternary ammonium base, a complete ester of a polyhydric alcohol with acrylic or methacrylic acid, allyl acrylate, allyl methacrylate and divinylbenzene, and mixtures thereof. Preferably, the functional monomer is selected from among an ethylenically unsaturated amide, an alkylol or alkoxyalkyl-substituted compound of ethylenically unsaturated amide, an ethylenically unsaturated monomer containing an oxirane group, hydroxyl group, carboxyl group, amino group or polyalkylene oxide group, a complete ester of a polyhydric alcohol with acrylic or methacrylic acid, allyl acrylate, allyl methacrylate and divinylbenzene, and mixtures thereof.

Examples of the ethylenically unsaturated amides and alkylol or alkoxyalkyl-substituted compounds of ethylenically unsaturated amide include (meth)acrylamide, diacetone (meth)acrylamide, N-methylol(meth)acrylamide, N-butoxymethyl(meth)acrylamide, and N-methoxymethyl(meth) acrylamide; examples of the ethylenically unsaturated monomers containing an oxirane group include glycidyl (meth)acrylate and glycidyl allyl ether; examples of the ethylenically unsaturated monomers containing a hydroxyl group include 2-hydroxyethyl (meth)acrylate and 2-hydroxypropyl(meth)acrylate; examples of the ethylenically unsaturated monomers containing a carboxyl group include (meth) acrylic acid, maleic anhydride, crotonic acid, and itaconic acid; examples of the ethylenically unsaturated monomers containing an amino group include N-dimethylaminoethyl (meth)acrylate and N-diethylaminoethyl(meth)acrylate. Examples of the ethylenically unsaturated monomers containing a sulfonate group include monomers of the following formula:

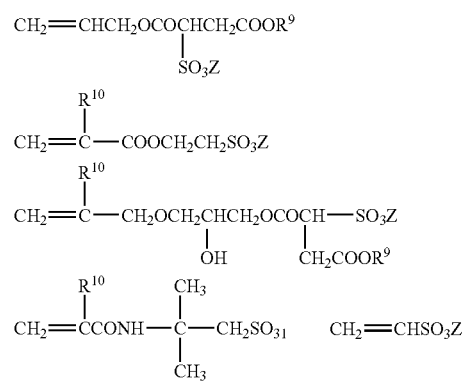

-continued

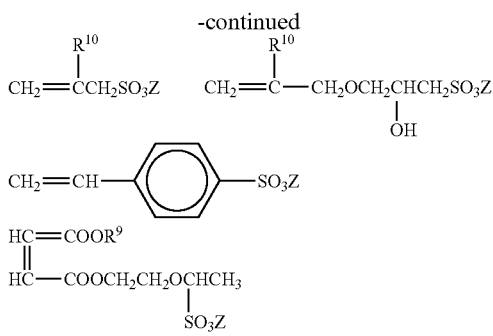

wherein $R^9$ is a $C_{1-18}$ alkyl group, $R^{10}$ is hydrogen or methyl, and Z is H, Na, K or $NH_4$. Examples of the ethylenically unsaturated monomers containing a phosphate group include monomers of the following formula:

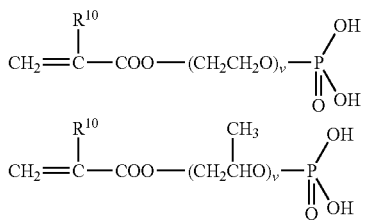

wherein $R^{10}$ is as defined above, and v is an integer of at least 1. Examples of the ethylenically unsaturated monomers containing a polyalkylene oxide group include monomers of the following formula:

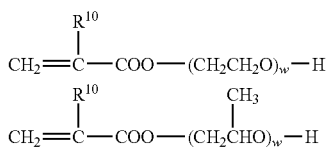

wherein $R^{10}$ is as defined above, and w is an integer of at least 2. Examples of the ethylenically unsaturated monomers containing a quaternary ammonium base include monomers of the following formula.

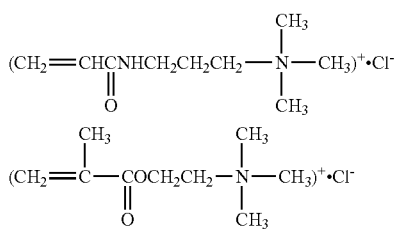

Examples of the complete esters of polyhydric alcohols with (meth)acrylic acid include ethylene glycol di(meth)acrylate, diethylene glycol di(meth)acrylate, and trimethylolpropane tri(meth)acrylate. Also useful are allyl(meth)acrylate and divinylbenzene. These monomers may be used alone or in admixture of any.

The functional monomers are employed for the purpose of imparting adhesion or the like. As the amount of functional monomer used increases, the adhesion of a coating is improved at the sacrifice of elasticity and flexibility. In this regard, the amount of functional monomer used is preferably 2 to 10% by weight, more preferably 2 to 7% by weight based on the total weight of component (2). More than 10% by weight of the functional monomer may substantially compromise elasticity and flexibility whereas less than 2% by weight of the functional monomer may fail to enhance adhesion and to form a uniform coating.

Constituent (c) is another ethylenically unsaturated monomer. Suitable monomers include styrene, α-methylstyrene, vinyltoluene, acrylonitrile, vinyl chloride, vinylidene chloride, vinyl acetate, vinyl propionate, and vinyl versatate.

Constituent (c) is preferably blended in amounts of 0 to 20% by weight, more preferably 2 to 15% by weight based on the total weight of component (2), if desired. Constituent (c) is effective for imparting adhesion and other properties which will not develop only with the monomer of formula (II) and the functional monomer, but can compromise the acrylic properties if used in excess of 20% by weight.

To impart flexibility to a coating resulting from the composition of the invention, a polymeric product from the monomer or monomeric mixture as component (2) may be made flexible. To this end, the polymeric product from the monomer or monomeric mixture should desirably have a glass transition temperature (Tg) of up to 0° C., more desirably up to −10° C. Then the foregoing monomers are desirably selected so as to give a Tg within the desired range. It is noted that the Tg of a polymeric product from the monomer or monomeric mixture as component (2) is a value determined through calculation according to the method of T. G. Fox described in Bull. Am. Phys. Soc., Vol. 1, page 123, 1956.

Components (1) and (2) are combined such that the ratio of the organopolysiloxane of component (1) to component (2) is between 5:95 and 95:5 in parts by weight, preferably between 20:80 and 80:20 in parts by weight. With less than 5 pbw of the organopolysiloxane, a coating becomes tacky and less flexible as drawbacks of acrylic polymers. With more than 95 pbw of the organopolysiloxane, a coating loses toughness, adhesion and sometimes durability or the like and becomes impractical.

Emulsion graft copolymerization of the organopolysiloxane of component (1) and the monomer or monomers of component (2) may be performed by any well-known emulsion polymerization process using customary radical initiators and under customary conditions. For example, unsaturated group-containing monomers and polymerization aids such as radical initiators, surfactants, pH modifiers, and antifoaming agents may be added in a lump or continuously. Some reactants or agents may be added continuously or in divided portions during polymerization.

Examples of the radical initiator which can be used herein include water-soluble types, for example, persulfates such as potassium persulfate and ammonium persulfate, aqueous hydrogen persulfate, t-butyl hydroperoxide, and the HCl salt of azobisamidinopropane; and oil-soluble types, for example, benzoyl peroxide, cumene hydroperoxide, dibutyl peroxide, diisopropyl peroxycarbonate, cumylperoxy neodecanoate, cumylperoxy octoate, and azobisisobutyronitrile. Redox systems having combined therewith reducing agents such as acidic sodium sulfite, Rongalit, L-ascorbic acid, sucroses and amines may be used, if desired.

An emulsifier may not necessarily be used at this stage because the emulsion of component (1) already contains an emulsifier. If desired, a new emulsifier may be added in a sufficient amount to prevent the generation of pseudo-masses during polymerization and to improve the stability of the emulsion. Examples of suitable emulsifiers which can be used herein include anionic emulsifiers such as alkyl or alkylallyl sulfates and sulfonates, and dialkyl sulfosuccinates; cationic emulsifiers such as alkyltrimethylammonium chlorides and alkylbenzylammonium chlorides; and nonionic emulsifiers such as polyoxyethylene alkyl phenyl ethers, polyoxyethylene alkyl ethers, and polyoxyethylene carboxylates.

In one preferred embodiment of the invention, a crosslinker and a catalyst for crosslinking reaction are incorporated in the graft copolymerized emulsion as the base. The crosslinker and catalyst are described below in detail.

As the crosslinker, it is recommended to use a liquid organopolysiloxane containing at least three hydrogen atoms each attached to a silicon atom in a molecule. Exemplary organopolysiloxanes are those of the following formulae.

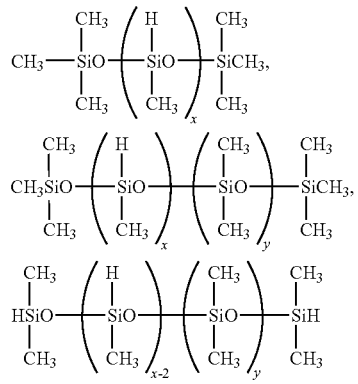

Herein, x is a positive integer of at least 3 and y is a positive integer.

Also useful are siloxane copolymers comprising $(CH_3)_2HSiO_{1/2}$ units, $(CH_3)_3SiO_{1/2}$ units, and $SiO_2$ units, and optionally, minor amounts of $(CH_3)HSiO$ units or $(CH_3)_2SiO$ units. The molar ratio of triorganosiloxy units to $SiO_2$ units may be in a range of from 0.5 to 2.0.

As long as the crosslinker is liquid, the viscosity of the crosslinker is not critical. A viscosity of 10 to 500 mPa·s, especially 50 to 250 mPa·s is preferred.

The crosslinker reacts with silicon atom-attached hydroxyl or alkoxy groups on the organopolysiloxane of component (1), to form a crosslinked coating, further enhancing the elastic and flexible effects.

Examples of the catalyst for crosslinking reaction include acetic acid salts of dibutyl tin and dioctyl tin, organic acid salts such as octylic acid salts and lauric acid salts, and titanates.

An appropriate amount of the crosslinker blended is 0 to 50 parts by weight, especially 5 to 40 parts by weight per 100 parts by weight of the copolymerized product of components (1) and (2). Likewise, an appropriate amount of the catalyst blended is 0 to 50 parts by weight, especially 2 to 25 parts by weight per 100 parts by weight of the copolymerized product of components (1) and (2). Both the crosslinker and catalyst can be incorporated as emulsion by dispersing and emulsifying them in water with the aid of a suitable emulsifier as mentioned above.

According to the invention, the graft copolymerized emulsion [A] obtained by adding the monomer as component (2) to the oil-in-water type emulsion of organopolysiloxane as component (1) and effecting emulsion graft polymerization is compounded with a silicone resin-containing emulsion [B] obtained by mixing a silicone resin having the average compositional formula (i) with a radical polymerizable vinyl monomer and effecting emulsion polymerization, for formulating the desired emulsion composition.

Described below is the silicone resin-containing emulsion [B]. The silicone resin has the average compositional formula (i):

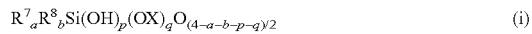

Herein $R^7$ is an unsubstituted monovalent hydrocarbon group of 1 to 10 carbon atoms, $R^8$ is a substituted monovalent hydrocarbon group of 1 to 10 carbon atoms, X is a monovalent hydrocarbon group of 1 to 6 carbon atoms, a, b, p and q are positive numbers satisfying the range: $0.50 \leq a \leq 1.80$, $0 \leq b \leq 1.00$, $0 < p \leq 1.50$, $0 \leq q \leq 0.50$, $0.50 \leq a+b \leq 1.80$, $0 < p+q \leq 1.50$, and $0.50 < a+b+p+q \leq 2.0$.

Specifically, $R^7$ is selected from unsubstituted monovalent hydrocarbon groups of 1 to 10 carbon atoms, for example, alkyl, aryl and aralkyl groups, such as methyl, ethyl, propyl, isopropyl, butyl, t-butyl, hexyl, cyclohexyl, octyl, decyl, and phenyl. Of these, methyl, propyl, hexyl and phenyl are preferred. In particular, methyl is preferred when weather resistance is required, long-chain alkyl groups are preferred when water repellency is required, and phenyl is preferred when it is desired to endow the coating with flexibility.

$R^8$ is selected from substituted monovalent hydrocarbon group of 1 to 10 carbon atoms, for example, substituted forms of unsubstituted monovalent hydrocarbon groups such as alkyl, aryl and aralkyl groups, in which some carbon-bonded hydrogen atoms are replaced by substituent groups. Suitable substituent groups which can be used herein include (i) halogen atoms such as fluorine and chlorine, (ii) alkenyl groups such as vinyl, (iii) epoxy functional groups such as glycidyloxy and epoxycyclohexyl, (iv) (meth)acrylic functional groups such as methacrylic and acrylic groups, (v) amino groups such as amino, aminoethylamino, phenylamino and dibutylamino, (vi) sulfur-containing functional groups such as mercapto and tetrasulfide groups, (vii) alkyl ether groups such as (polyoxyalkylene) alkyl ether groups, (viii) anionic groups such as carboxyl and sulfonyl groups, and (ix) quaternary ammonium salt structure-containing groups.

Examples of substituted organic groups include trifluoropropyl, perfluorobutylethyl, perfluorooctylethyl, 3-chloropropyl, 2-(chloromethylphenyl)ethyl, vinyl, 5-hexenyl, 9-decenyl, 3-glycidyloxypropyl, 2-(3,4-epoxycyclohexyl)ethyl, 5,6-epoxyhexyl, 9,10-epoxydecyl, 3-(meth)acryloxypropyl, (meth)acryloxymethyl, 11-(meth)acryloxyundecyl, 3-aminopropyl, N-(2-aminoethyl)aminopropyl, 3-(N-phenylamino)propyl, 3-dibutylaminopropyl, 3-mercaptopropyl, 2-(4-mercaptomethylphenyl)ethyl, polyoxyethyleneoxypropyl, 3-hydroxycarbonylpropyl, and 3-tributylammoniumpropyl. When it is desired to enhance adhesion to substrates, preference is given to epoxy, amino and mercapto functional groups. When it is desired to form an intimate block with the vinyl polymer, preference is given to (meth)acrylic functional groups capable of radical copolymerization or mercapto functional groups having the function of a chain transfer agent. An attempt to form a crosslinkage with the vinyl polymer via bonds other than the siloxane bond may be attained by previously incorporating in the silicone resin functional groups capable of reacting with organic functional groups in the vinyl polymer, for example, epoxy groups (for reaction with hydroxyl, amino, carboxyl and other groups) and amino groups (for reaction with epoxy, acid anhydride and other groups).

OX group is a hydrolyzable group, wherein X stands for a monovalent hydrocarbon group of 1 to 6 carbon atoms such as alkyl, aryl and alkenyl groups. Examples of the hydrolyzable group OX include methoxy, ethoxy, propoxy, isopropoxy, butoxy, sec-butoxy, t-butoxy, isopropenoxy, and phenoxy groups. For hydrolytic condensation reactivity and stability in emulsion, methoxy, ethoxy and isopropoxy groups may be used.

The subscripts a, b, p and q are positive numbers satisfying the range: $0.50 \leq a \leq 1.80$, $0 \leq b \leq 1.00$, $0 < p \leq 1.50$, $0 \leq q \leq 0.50$, $0.50 \leq a+b \leq 1.80$, $0 < p+q \leq 1.50$, and $0.50 < a+b+p+q \leq 2.0$. Values of "a" less than 0.50 correspond to low contents of nonfunctional organic groups, resulting in a cured coating becoming too hard and likely to crack. Values of "a" more than 1.80 correspond to low proportions of chain units, resulting in a cured coating becoming rubbery and short of mar resistance. Preferably, "a" is in a range from 0.60 to 1.50. With $b > 1.00$, the content of bulky organic functional groups is high, inviting difficulty to maintain hardness and a loss of weather resistance. If it is unnecessary to impart the above-described function of a particular organic functional group, the organic functional group need not be included. The optimum range of a+b is set for the same reason as described for a. Silanol groups are essential although the silicone resin becomes unstable if p indicative of the content of silanol groups is more than 1.50. For ensuring storage stability and effective cure at the same time, the preferred range of p is from 0.05 to 0.80 and more preferably from 0.20 to 0.70. Beside the silanol groups, hydrolyzable groups capable of crosslinking may be present, but should be in an amount of equal to or less than 0.50 if present. If hydrolyzable groups are present beyond that limit, the silicone resin becomes more hydrolyzable in water and undesirably forms in the system a by-product alcohol which is an organic solvent. The sum of p+q indicative of the total number of crosslinkable substituent groups should be from more than 0 to 1.50. If p+q=0, no cure occurs. If p+q is more than 1.50, the molecule becomes undesirably smaller so that water solubility dominates. If the sum of a+b+p+q is equal to or less than 0.50, the coating becomes less transparent. If the sum of a+b+p+q is more than 2.0, the coating becomes under-cured and loses some hardness.

In addition to the above requirements, the silicone resin which can be used herein should contain silanol groups and be insoluble in water by itself. If the silicone resin is dissolved in water, it is not fully incorporated into particles during emulsion polymerization, which is undesirable. Thus simple hydrolysis of a hydrolyzable silane compound in water is insufficient.

The radical polymerizable vinyl monomer may be any of prior art well-known vinyl monomers capable of radical polymerization. Suitable vinyl monomers include (a) (meth) acrylic acid esters such as methyl, ethyl, propyl, isopropyl, butyl, isobutyl, octyl, 2-ethylhexyl, lauryl, stearyl and cyclohexyl esters of acrylic acid and methacrylic acid; (b) vinyl monomers containing a carboxyl group or anhydride thereof such as acrylic acid, methacrylic acid, and maleic anhydride; (c) hydroxyl group-containing vinyl monomers such as 2-hydroxyethyl(meth)acrylate and 2-hydroxypropyl(meth)acrylate; (d) amide group-containing vinyl monomers such as (meth)acrylamide, N-methylol(meth)acrylamide, N-methoxymethyl(meth)acrylamide, N-butoxymethyl(meth)acrylamide, diacetone(meth)acrylamide; (e) amino group-containing vinyl monomers such as dimethylaminoethyl(meth) acrylate and diethylaminoethyl (meth)acrylate; (f) alkoxyl group-containing vinyl monomers such as methoxyethyl (meth)acrylate and butoxyethyl (meth)acrylate; (g) glycidyl group-containing vinyl monomers such as glycidyl(meth) acrylate and glycidyl allyl ether; (h) vinyl ester monomers such as vinyl acetate and vinyl propionate; (i) aromatic vinyl monomers such as styrene, vinyltoluene and α-methylstyrene; (j) vinyl cyanide monomers such as (meth)acrylonitrile; (k) vinyl halide monomers such as vinyl chloride and vinyl bromide; (l) vinyl monomers containing two or more radical polymerizable unsaturated groups on the molecule such as divinyl benzene, allyl (meth)acrylate, ethylene glycol di(meth)acrylate, diethylene glycol di(meth)acrylate, and trimethylol propane tri(meth)acrylate; and (m) (poly)oxyethylene chain-containing vinyl monomers such as (poly)oxyethylene mono(meth)acrylate having 1 to 100 ethylene oxide groups. Of these, alkyl (meth)acrylate having a $C_1$-$C_{18}$ alkyl group is essential, with its content being preferably 1 to 100 mol %. Less than 1 mol % of the alkyl(meth)acrylate may fail to provide chemical resistance and desired other properties. The preferred amount of alkyl(meth)acrylate is 30 to 99 mol %.

It is preferred to use 10 to 1,000 parts by weight of the radical polymerizable vinyl monomer per 100 parts by weight of the silicone resin. Less than 10 pph of the vinyl monomer is undesirable because of insufficient film formation and chemical resistance. More than 1,000 pph of the vinyl monomer is unsuitable because of shortage of weather resistance and water resistance. More preferably, 30 to 500 parts by weight of the radical polymerizable vinyl monomer is used per 100 parts by weight of the silicone resin.

For emulsion polymerization, a surfactant may be used. Use may be made of prior art well-known nonionic, cationic and anionic surfactants, and reactive emulsifiers having a radical polymerizable functional group. Suitable surfactants include nonionic surfactants such as polyoxyethylene alkyl ethers, polyoxyethylene alkyl phenyl ethers, polyoxyethylene carboxylic acid esters, sorbitan esters, and polyoxyethylene sorbitan esters; cationic surfactants such as alkyltrimethylammonium chlorides and alkylbenzylammonium chlorides; anionic surfactants such as alkyl or alkylallyl sulfates, alkyl or alkylallyl sulfonates, and dialkylsulfosuccinates; and ampholytic surfactants such as amino acid and betaine type surfactants. Also useful are reactive surfactants including such derivatives as radical polymerizable (meth) acrylate, styrene and maleate compounds containing in a molecule a hydrophilic group such as a sulfonic acid salt, polyoxyethylene chain, or quaternary ammonium salt, as described in JP-A 8-27347. These surfactants may be used alone or in admixture. An appropriate amount of the surfactant used is about 0.5 to 15% by weight, especially about 1 to 10% by weight based on the weight of the polymer.

For emulsion polymerization, a radical polymerization initiator is often used. Examples of the polymerization initiator include persulfates such as potassium persulfate and ammonium persulfate; water-soluble initiators such as aqueous hydrogen peroxide, t-butylhydroperoxide, t-butylperoxymaleic acid, succinic acid peroxide, and 2,2-azobis(2-N-benzylamidino)propane hydrogen chloride; oil-soluble initiators such as benzoyl peroxide, cumene hydroperoxide, dibutyl peroxide, diisopropylperoxydicarbonate, cumylperoxyneodecanoate, cumylperoxyoctoate, and azoisobutyronitrile; and redox initiators combined with reducing agents such as acidic sodium sulfite, Rongalit and ascorbic acid. An appropriate amount of the polymerization initiator used is about 0.1 to 10% by weight, especially about 0.5 to 5% by weight based on the radical polymerizable vinyl monomer.

Radical polymerization may be effected under ordinary conditions. Suitable polymerization conditions include a temperature of 10 to 90° C., preferably 50 to 80° C., a time of about 2 to 20 hours, and an atmosphere of inert gas such as nitrogen gas.

The silicone resin-containing emulsion [B] is compounded with the graft copolymerized emulsion [A] in such amounts that 10 to 70 parts by weight, more preferably 20 to 60 parts by weight of solids of emulsion [B] is available relative to 100 parts by weight of solids of emulsion [A]. With too less amounts of emulsion [B], water resistance and mar resistance may become poor. With too much amounts of emulsion [B], flexibility may become poor.

To the emulsion composition for building exterior walls according to the invention, various additives may be added in accordance with a particular purpose. For forming a matte coating, for example, matte agents including silicic acids (e.g., silicic anhydride and hydrated silicic acid), silicates (e.g., aluminum silicate, magnesium silicate, clay and talc), calcium carbonate, barium carbonate, gypsum, talc, alumina white, and powdered synthetic resins are added to the composition, after which the matte agent is dispersed by means of a dispersing machine such as a ball mill, colloid mill, homo-mixer, sand mill or disper. Pigments, dyes or the like may be added if a colored coating is desired.

If it is necessary to adjust the viscosity of the emulsion composition, polyvinyl alcohol, gelatin, cellulose derivatives (e.g., methyl cellulose, carboxymethyl cellulose, hydroxyethyl cellulose and hydroxypropyl cellulose), xanthane gum, sodium polyacrylate, polyacrylamide or the like may be added in appropriate amounts.

Additionally, anti-foaming agents, preservatives and mildew-proofing agents may be added if so desired and as long as the objects of the invention are not impaired.

The emulsion composition for building exterior walls of the invention is obtainable by combining the graft copolymerized emulsion [A] as a base with the silicone resin-containing emulsion [B], adding the above-mentioned additives, if necessary, and mixing them. The emulsion composition of the invention is preferably adjusted to a solids level of 30 to 70% by weight, more preferably 40 to 60% by weight.

The emulsion composition is applied to a variety of building exterior walls such that the coating as cured may have a thickness of 10 to 800 μm, especially 20 to 500 μm, and cured whereby the coating is ready for use. Suitable curing conditions include a temperature of 100 to 180° C., especially 130 to 160° C. and a time of 2 to 30 minutes, especially 2 to 20 minutes.

The surface to which the emulsion composition is to be applied may be any of surfaces of inorganic and plastic substrates. Surfaces of inorganic substrates are preferred, for example, surfaces of concrete, siding materials, porcelain tiles, mortar, brick and stone.

The application means is not particularly limited. Any of spray coating, roller coating, brush coating, flow coating and dip coating may be used. The emulsion composition is applied such that the coating as cured may have a thickness of 10 to 800 μm, especially 20 to 500 μm.

EXAMPLE

Examples of the invention are given below together with Comparative Examples for illustrating the invention. Examples are not intended to limit the invention thereto. All parts and percents are by weight.

Examples 1-14 and Comparative Examples 1-4

[Preparation of Organopolysiloxane Emulsion]

To a mixture of 1,500 parts of octamethylcyclotetrasiloxane, 3.8 parts of methacryloxypropylmethylsiloxane, and 1,500 parts of deionized water, were added 15 parts of sodium laurylsulfate and 10 parts of dodecylbenzenesulfonic acid. The mixture was agitated by a homo-mixer for emulsification and passed twice through a homogenizer under a pressure of 3,000 bar, forming a stable emulsion. Next, the emulsion was contained in a flask, heated at 70° C. for 12 hours, then cooled to 25° C., and ripened for 24 hours at the temperature, after which the emulsion was adjusted to pH 7 using sodium carbonate. Nitrogen gas was blown into the emulsion for 4 hours, after which steam stripping was performed to distill off volatile siloxanes. Then deionized water was added to adjust to a non-volatile content of 45%, yielding an emulsion of polysiloxane containing 0.1 mol % methacrylic group, designated Emulsion E-1.

Polysiloxane emulsions E-2 to E-7 were prepared by the same procedure as E-1 except that the type and amount of siloxanes and ripening conditions were changed as shown in Table 1.

TABLE 1

| | Polysiloxane emulsion | E-1 | E-2 | E-3 | E-4 | E-5 | E-6 | E-7 |
|---|---|---|---|---|---|---|---|---|
| Siloxane (pbw) | octamethylcyclotetrasiloxane | 1500 | 1500 | 1500 | 1500 | 1500 | 1500 | 1500 |
| | methacryloxypropylmethylsiloxane | 3.8 | 19 | | | | | |
| | acryloxypropylmethylsiloxane | | | 3.5 | 35 | | | |
| | mercaptopropylmethylsiloxane | | | | | 48.2 | | |
| | vinylmethylsiloxane | | | | | | 17.2 | 34.4 |
| Ripening conditions | | 25° C./ 24 hr | 15° C./ 72 hr | 10° C./ 72 hr | 10° C./ 72 hr | 10° C./ 72 hr | 10° C./ 72 hr | 10° C./ 72 hr |

[Copolymerized Emulsions]

A 2-liter three-necked flask equipped with a stirrer, condenser, thermometer and nitrogen gas inlet was charged with 333 parts of Emulsion E-1 (siloxane values 150 parts) and 517 parts of deionized water. The flask was conditioned at 30° C. under a nitrogen gas stream, after which 1.0 part of t-butyl hydroperoxide, 0.5 part of L-ascorbic acid and 0.002 part of iron (II) sulfate heptahydrate were added. While the flask was kept at an internal temperature of 30° C., a mixture of 328.6 parts of butyl acrylate, 10.5 parts of acrylic acid, and 5.3 parts of methacrylic acid and 56 parts of a 10% aqueous solution of N-methylolacrylamide were added dropwise over 3 hours. At the end of dropwise addition, agitation was continued for a further one hour to drive the reaction to completion. The copolymerized emulsion thus obtained, designated P-1, had a solids concentration of 39.2%. The polymeric product of acrylic monomers has a Tg of −46° C. as calculated.

Similarly, copolymerized emulsions P-2 to P-13 were prepared through copolymerization using the type and amount of polysiloxane emulsion and acrylic and other monomers as shown in Table 2.

TABLE 2

| Copolymerized emulsion | | P-1 | P-2 | P-3 | P-4 | P-5 | P-6 | P-7 | P-8 | P-9 | P-10 | P-11 | P-12 | P-13 |
|---|---|---|---|---|---|---|---|---|---|---|---|---|---|---|
| Polysiloxane emulsion (pbw) | E-1 | 333 (150) | | | | | 333 (150) | | | | 33.3 (15) | 777 (350) | | |
| | E-2 | | 556 (250) | | | | | | | | | | | |
| | E-3 | | | 333 (150) | 333 (150) | | | | | | | | | |
| | E-4 | | | | | 333 (150) | | | | | | | | |
| | E-5 | | | | | | | | 333 (150) | | | | | |
| | E-6 | | | | | | | | | 333 (150) | | | | |
| | E-7 | | | | | | | | | | 333 (150) | | | |
| Acrylic and other monomers (pbw) | ethyl acrylate | | | 328.6 | | | | | | | | | | 328.6 |
| | butyl acrylate | 328.6 | 234.7 | | 328.6 | 164.3 | 164.3 | 312.2 | 328.6 | 328.6 | 328.6 | 14.08 | 328.6 | |
| | 2-ethylhexyl acrylate | | | | | 164.3 | 164.3 | | | | | | | |
| | acrylic acid | 10.5 | 7.5 | 10.5 | 10.5 | 10.5 | 10.5 | 15.8 | 10.5 | 10.5 | 10.5 | 0.45 | 10.5 | 10.5 |
| | methacrylic acid | 5.3 | 3.8 | 5.3 | 5.3 | 5.3 | 5.3 | | 5.3 | 5.3 | 5.3 | 0.23 | 5.3 | 5.3 |
| | N-methylolacrylamide | 5.6 | 4.0 | 2.1 | 5.6 | | | | 5.6 | 5.6 | 5.6 | 0.24 | 5.6 | 2.1 |
| | N-butoxymethylacrylamide | | | | | 5.6 | 5.6 | | | | | | | |
| | glycidyl methacrylate | | | | | | | 5.6 | | | | | | |
| | 2-hydroxyethyl methacrylate | | | 3.5 | | | | | | | | | | 3.5 |
| | styrene | | | | | | | 16.4 | | | | | | |
| | Sub-total | 350 | 250 | 350 | 350 | 350 | 350 | 350 | 350 | 350 | 350 | 15 | 350 | 350 |
| Tg calculated of polymeric product (°C.) | | −46 | −46 | −16 | −46 | −55 | −55 | −42 | −46 | −46 | −46 | −46 | −46 | −16 |

In connection with the polysiloxane emulsion, the value in parentheses represents the amount of polysiloxane.

[Preparation of Silicone Resin]

A 2-liter flask was charged with 408 g (3.0 mol) of methyltrimethoxysilane, to which 786 g of water was added in a nitrogen atmosphere and at 0° C., followed by thorough mixing. Under ice cooling, 216 g of 0.05N aqueous hydrochloric acid was added dropwise over 40 minutes while hydrolysis reaction took place. After the completion of dropwise addition, agitation was continued below 10° C. for one hour until the completion of hydrolysis reaction.

Next, the methanol formed and water were distilled off in vacuo under conditions of 70° C. and 60 Torr. Distillation was continued until no methanol was detected in the distillate. The detection of methanol ceased when the reaction mixture was concentrated to 88% of the initial, and at the same time, the liquid started to turn white turbid. The liquid was allowed to stand for one day, whereupon it separated into two layers, with the silicone resin precipitated.

A portion was sampled out of the liquid. The precipitated silicone resin was dissolved in methyl isobutyl ketone and separated from water. After the removal of water, the silicone resin was subjected to Gremia reaction by which silanol groups were quantitatively determined, finding a silanol content of 8.2% based on the silicone resin. On GPC analysis, the silicone resin was found to have a number average molecular weight of $1.8 \times 10^3$. IR spectroscopy analysis manifested the absence of residual methoxy groups, suggesting that the silicone resin has the following average compositional formula.

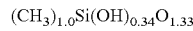

$(CH_3)_{1.0}Si(OH)_{0.34}O_{1.33}$

Therefore, this silicone resin would yield no organic solvent as a by-product.

To the aqueous liquid of the silicone resin was added 300 g (3 mol) of methyl methacrylate (MMA), in which the precipitated silicone resin was dissolved and then separated from the water layer as the silicone resin-containing MMA solution. There was obtained 505 g of the MMA solution (A) having a nonvolatile content of 40.2% when heated at 105° C. for 3 hours.

[Silicone Resin-containing Emulsion]

A polymerization vessel equipped with an agitator, condenser, thermometer and nitrogen gas inlet was charged with 730 parts of deionized water, 0.47 part of sodium carbonate as a pH buffer, and 4.70 parts of boric acid. With stirring, the vessel was heated to 60° C. after which it was purged with nitrogen. To the solution, 1.75 parts of Rongalit, 0.12 part of a 1% aqueous solution of disodium ethylenediaminetetraacetate and 0.04 part of a 1% aqueous solution of ferrous sulfate were added. At the same time, a mixture of 560 parts of the silicone resin-containing MMA solution, 140 parts of butyl acrylate, 2.1 parts of t-butyl hydroperoxide (purity 69%), 14.0 parts of reactive surfactant Aqualon RN-20 (trade name by Dai-Ichi Kogyo Seiyaku Co., Ltd.) and 7.0 parts of Aqualon HS-10 (trade name by Dai-Ichi Kogyo Seiyaku Co., Ltd.) was constantly added over 2.5 hours while keeping the temperature within the vessel at 60° C. This was followed by 2 hours of reaction at 60° C. to drive the polymerization to completion.

fying 30 parts of dibutyltin dilaurate in 67 parts of deionized water using 3 parts of polyoxyethylene alkyl ether.

With respect to the silanol-containing silicone resin, an emulsion containing 148.8 parts of methyl methacrylate and 62.2 parts of butyl acrylate relative to 100 parts of the silicone resin was used.

TABLE 3

| | | Example | | | | | | | | | | | | | | Comparative Example | | | |
|---|---|---|---|---|---|---|---|---|---|---|---|---|---|---|---|---|---|---|---|
| No. | | 1 | 2 | 3 | 4 | 5 | 6 | 7 | 8 | 9 | 10 | 11 | 12 | 13 | 14 | 1 | 2 | 3 | 4 |
| | | Ingredients (pbw) | | | | | | | | | | | | | | | | | |
| Copolymerized emulsion | P-1 | 75 | | | | | | | | | 100 | | | 65 | | | | | |
| | P-2 | | 75 | | | | | | | | | | | | | | | | |
| | P-3 | | | 75 | | | | | | | | | | | | | | | |
| | P-4 | | | | 75 | | | | | | | 100 | | | 55 | | | | |
| | P-5 | | | | | 75 | | | | | | | | | | | | | |
| | P-6 | | | | | | 75 | | | | | | | | | | | | |
| | P-7 | | | | | | | 75 | | | | | | | | | | | |
| | P-8 | | | | | | | | 75 | | | | | | | | | | |
| | P-9 | | | | | | | | | 75 | | | 100 | | | | | | |
| | P-10 | | | | | | | | | | | | | | | 75 | | | |
| | P-11 | | | | | | | | | | | | | | | | 75 | | |
| | P-12 | | | | | | | | | | | | | | | | | 100 | |
| | P-13 | | | | | | | | | | | | | | | | | | 100 |
| Crosslinker | | 15 | 15 | 15 | 15 | 15 | 15 | 15 | 15 | 15 | | | | 15 | 15 | 15 | 15 | | |
| Catalyst | | 10 | 10 | 10 | 10 | 10 | 10 | 10 | 10 | 10 | | | | 10 | 10 | 10 | 10 | | |
| Silicone resin-containing emulsion | | 20 | 30 | 40 | 20 | 20 | 20 | 20 | 20 | 20 | 20 | 20 | 20 | 20 | 30 | | | | |
| | | Results | | | | | | | | | | | | | | | | | |
| Elasticity | | ○ | ○ | ○ | ○ | ○ | ○ | ○ | ○ | ○ | ○ | ○ | ○ | ○ | ○ | X | ○ | X | X |
| Flexibility | | ○ | ○ | Δ | ○ | ○ | ○ | ○ | ○ | ○ | ○ | ○ | ○ | Δ | Δ | X | ○ | X | X |
| Pencil hardness | | 2B | B | 2H | 2B | 2B | 2B | 2B | 2B | 2B | F | F | F | H | 2H | F | 4B | F | F |
| Gloss retention | | ○ | ○ | ○ | ○ | ○ | ○ | ○ | ○ | ○ | ○ | ○ | ○ | ○ | ○ | X | ○ | X | X |
| Water resistance | | ○ | ○ | ○ | ○ | ○ | ○ | ○ | ○ | ○ | ○ | ○ | ○ | ○ | ○ | Δ | Δ | X | X |
| Contact angle with water (°) | | 96 | 108 | 118 | 97 | 95 | 104 | 92 | 97 | 94 | 98 | 98 | 96 | 98 | 110 | 65 | 91 | 59 | 58 |
| Adhesion | | 100 | 100 | 100 | 100 | 100 | 100 | 100 | 100 | 100 | 80 | 80 | 60 | 100 | 100 | 80 | 40 | 80 | 80 |
| Heat resistance | | ○ | ○ | ○ | ○ | ○ | ○ | ○ | ○ | ○ | ○ | ○ | ○ | ○ | ○ | X | Δ | X | X |

* The value in pbw of an ingredient is the amount of its effective component or solids.

The thus obtained emulsion had a solid concentration of 50.1% and pH 7.0.

[Evaluation]

For each of the copolymerized emulsions P-1 through P-13, a processing solution was prepared as shown in Table 3, applied to a clean surface of a cold finished steel strip, and cured to form a coating of 500 μm thick. Note that the coating was cured by heating at 150° C. for 5 minutes. An exterior wall material was formed in this way.

The crosslinker shown in Table 3 was an emulsion obtained by dispersing and emulsifying 30 parts of methylhydrogenpolysiloxane of the formula:

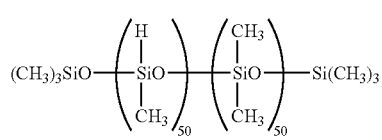

having a viscosity of 150 mPa·s in 65 parts of deionized water using 5 parts of polyoxyethylene alkyl phenyl ether. The catalyst was an emulsion obtained by dispersing and emulsi-

[Tests]

Elasticity:
rated with hand touch according to the criterion:
○: good repulsion and torsion recovery
X: poor repulsion and torsion recovery Flexibility:
rated with hand touch according to the criterion:
○: good bending recovery
X: poor bending recovery Pencil Hardness:
The pencil hardness of a cured coating was measured according to JIS K-5400 using Uni pencil by Mitsubishi Pencil Co., Ltd.

Gloss Retention:
visually observed and rated according to the criterion:
○: the gloss of a specimen after one year of outdoor exposure is comparable to that of an unexposed specimen
Δ: the gloss of a specimen after one year of outdoor exposure is inferior to that of an unexposed specimen
X: a specimen loses gloss after one year of outdoor exposure Water Resistance:

A coating was immersed in distilled water at 20° C. for 72 hours before it was visually observed and rated according to the criterion:
- ○: no change
- Δ: partially blistered and whitened
- X: entirely blistered and whitened Contact Angle with Water:

Using a contact angle meter CA-D (Kyowa Interface Science Co., Ltd.), the contact angle of a deionized water droplet on a coating after 30 seconds from dropping was measured.

Adhesion:

A coating was examined by the cross-hatch adhesive tape test according to JIS K-5400 and rated according to the following criterion.
- 100 points: each scribing line is narrow, and every intersection between scribing lines and every square remain intact
- 80 points: slight peel at intersections between scribing lines, with the area of deficiencies being less than 10% of the total area of squares
- 60 points: peel at opposite sides of and intersections between scribing lines, with the area of deficiencies being less than 20% of the total area of squares
- 40 points: wide peel along scribing lines, with the area of deficiencies being less than 40% of the total area of squares
- 20 points: wide peel along scribing lines, with the area of deficiencies being less than 60% of the total area of squares
- 0 point: the area of peel is 60% or more of the total area of squares Heat Resistance:

A coating was heat treated in a dryer at 100° C. for 48 hours, after which it was visually observed for color change and rated according to the criterion.
- ○: no thermal discoloration
- Δ: some thermal discoloration
- X: noticeable thermal discoloration Japanese Patent Application No. 2003-186205 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A building exterior wall having a coating thereon, the coating is formed from an emulsion composition comprising in admixture, a graft copolymerized emulsion obtained by adding to (1) an oil-in-water type emulsion containing at least one organopolysiloxane having the general formula (I):

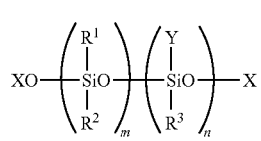

wherein $R^1$, $R^2$ and $R^3$ each are a monovalent hydrocarbon group or monovalent halogenated hydrocarbon group having 1 to 20 carbon atoms, Y is an organic group containing a radical reactive group or SH group, X is hydrogen, a monovalent lower alkyl group or a group of the formula: $R^1R^2R^4Si$ wherein $R^4$ is $R^1$ or Y, and $R^1$, $R^2$ and Y are as defined above, m is an integer of 1 to 10,000, and n is an integer of at least 1, (2) a monomer or monomeric mixture containing at least 70% by weight of at least one monomer selected from acrylic and methacrylic monomers having the general formula (II):

wherein $R^5$ is hydrogen or methyl, and $R^6$ is an alkyl or alkoxy-substituted alkyl group having 1 to 18 carbon atoms, so that a weight ratio of the organopolysiloxane of component (1) and the monomer or monomeric mixture of component (2) is 5:95 to 95:5, and effecting emulsion graft polymerization of component (2) to the organopolysiloxane, and a silicone resin-containing emulsion obtained by mixing a silicone resin having the average compositional formula (i):

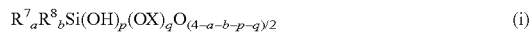

wherein $R^7$ is an unsubstituted monovalent hydrocarbon group of 1 to 10 carbon atoms, $R^8$ is a substituted monovalent hydrocarbon group of 1 to 10 carbon atoms, X is a monovalent hydrocarbon group of 1 to 6 carbon atoms, a, b, p and q are positive numbers satisfying the range: $0.50 \leq a \leq 1.80$, $0 \leq b \leq 1.00$, $0 < p \leq 1.50$, $0 \leq q \leq 0.50$, $0.50 \leq a+b \leq 1.80$, $0 < p+q \leq 1.50$, and $0.50 < a+b+p+q \leq 2.0$, with a radical polymerizable vinyl monomer and effecting emulsion polymerization.

2. The building exterior wall of claim 1 wherein component (2) is a monomeric mixture of (a) 70 to 98% by weight of at least one monomer selected from acrylic and methacrylic monomers having the general formula (II):

wherein $R^5$ is hydrogen or methyl, and $R^6$ is an alkyl or alkoxy-substituted alkyl group having 1 to 18 carbon atoms, (b) 2 to 10% by weight of at least one functional monomer selected from the group consisting of an ethylenically unsaturated amide, an alkylol or alkoxyalkyl-substituted compound of ethylenically unsaturated amide, an ethylenically unsaturated monomer containing an oxirane group, hydroxyl group, carboxyl group, amino group, sulfonate group, phosphate group, polyalkylene oxide group or quaternary ammonium base, a complete ester of a polyhydric alcohol with acrylic or methacrylic acid, allyl acrylate, allyl methacrylate and divinylbenzene, and (c) 0 to 20% by weight of an ethylenically unsaturated monomer other than components (a) and (b).

3. The building exterior wall of claim 1 wherein a polymeric product of the monomer or monomeric mixture of component (2) has a glass transition temperature of up to 0° C.

4. The building exterior wall of claim 1 wherein the emulsion composition further comprises a liquid organopolysiloxane containing at least three silicon-bonded hydrogen atoms in a molecule as a crosslinker and a catalyst for crosslinking reaction.

* * * * *